(12) United States Patent
Akiyama et al.

(10) Patent No.: US 11,993,252 B2
(45) Date of Patent: May 28, 2024

(54) VEHICLE CONTROL APPARATUS

(71) Applicant: SUBARU CORPORATION, Tokyo (JP)

(72) Inventors: Satoru Akiyama, Tokyo (JP); Eiichi Shiraishi, Tokyo (JP); Takashi Takeda, Tokyo (JP); Shintaro Ikeda, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 154 days.

(21) Appl. No.: 17/534,115

(22) Filed: Nov. 23, 2021

(65) Prior Publication Data

US 2022/0185263 A1   Jun. 16, 2022

(30) Foreign Application Priority Data

Dec. 16, 2020   (JP) .................................. 2020-208128

(51) Int. Cl.
*B60W 30/02* (2012.01)
*B60T 7/22* (2006.01)
(Continued)

(52) U.S. Cl.
CPC ............... *B60W 30/02* (2013.01); *B60T 7/22* (2013.01); *B60T 8/17551* (2013.01);
(Continued)

(58) Field of Classification Search
CPC ...... B60W 30/02; B60W 10/18; B60W 10/20; B60W 2520/14; B60W 2540/18;
(Continued)

(56) References Cited

U.S. PATENT DOCUMENTS 8,855,884 B1 * 10/2014 Fujitsuka ............ B60R 21/0136
180/282
9,643,600 B2 * 5/2017 Takahashi ............ B60W 30/02
(Continued)

FOREIGN PATENT DOCUMENTS

FR       2949414 A1 *  3/2011  ............ B60T 8/1755
JP    10-258756 A     9/1998
(Continued)

OTHER PUBLICATIONS

Integrated Feedback Compensation Control and Model Predictive Control (Year: 2018).*
(Continued)

*Primary Examiner* — Jason Holloway
*Assistant Examiner* — Kyle T Johnson
(74) *Attorney, Agent, or Firm* — Rimon P.C.

(57) ABSTRACT

A vehicle control apparatus includes a contact detector, an attitude stabilization processor, and a steering intention determining unit. The contact detector is configured to detect a contact of a vehicle with an object. The attitude stabilization processor is configured to execute an attitude stabilization control that generates a yaw moment at a vehicle body on the basis of a deviation between a target yaw rate and an actual yaw rate. The steering intention determining unit is configured to determine a presence of a driver's intention to perform steering. The attitude stabilization processor is configured to stop the generation of the yaw moment by the attitude stabilization control or reduce the yaw moment to be generated by the attitude stabilization control, in a case where the steering intention determining unit determines that the driver's intention to perform the steering is absent after the detection of the contact by the contact detector.

8 Claims, 6 Drawing Sheets

(51) Int. Cl.
*B60T 8/1755* (2006.01)
*B60T 8/24* (2006.01)
*B60W 10/18* (2012.01)
*B60W 10/20* (2006.01)
*B62D 6/10* (2006.01)

(52) U.S. Cl.
CPC ............ *B60T 8/246* (2013.01); *B60W 10/18* (2013.01); *B60W 10/20* (2013.01); *B62D 6/10* (2013.01); *B60T 2250/03* (2013.01); *B60W 2520/14* (2013.01); *B60W 2540/18* (2013.01); *B60W 2710/18* (2013.01); *B60W 2710/207* (2013.01); *B60W 2720/14* (2013.01)

(58) Field of Classification Search
CPC ....... B60W 2710/18; B60W 2710/207; B60W 2720/14; B60W 30/08; B60W 2030/082; B60T 7/22; B60T 8/17551; B60T 8/246; B60T 2250/03; B60T 2201/024; B62D 6/10; B62D 15/025; B62D 7/159
See application file for complete search history.

(56) References Cited

U.S. PATENT DOCUMENTS

| | | | | |
|---|---|---|---|---|
| 9,771,068 | B2* | 9/2017 | Kizumi | ................. G01C 21/26 |
| 2006/0015231 | A1* | 1/2006 | Yoshimura | ............ B60L 3/0076 |
| | | | | 701/1 |
| 2009/0299573 | A1* | 12/2009 | Thrun | ................. B62D 15/025 |
| | | | | 701/41 |
| 2010/0004815 | A1* | 1/2010 | Ewerhart | ........... B62D 15/0265 |
| | | | | 342/357.62 |
| 2011/0054741 | A1* | 3/2011 | Stabrey | ................. B62D 6/003 |
| | | | | 701/43 |
| 2013/0261898 | A1* | 10/2013 | Fujita | ..................... B62D 7/159 |
| | | | | 701/42 |
| 2014/0371989 | A1* | 12/2014 | Trimboli | ............... B60W 40/09 |
| | | | | 701/41 |
| 2016/0288707 | A1* | 10/2016 | Matsumura | ........... B60W 50/14 |
| 2022/0153244 | A1* | 5/2022 | Nakayama | .......... B60T 8/17558 |
| 2022/0185263 | A1* | 6/2022 | Akiyama | ............... B62D 7/159 |
| 2022/0289174 | A1* | 9/2022 | Hashimoto | .......... B60W 10/18 |
| 2023/0110341 | A1* | 4/2023 | Streiter | ............ B60W 30/0956 |
| | | | | 701/23 |

FOREIGN PATENT DOCUMENTS

| | | |
|---|---|---|
| JP | 2008-537920 A | 10/2008 |
| JP | 2009-208559 A | 9/2009 |
| JP | 2014-237341 A | 12/2014 |
| JP | 2017-030659 A | 2/2017 |
| KR | 20150141187 A * 12/2015 | ............ B60W 10/18 |

OTHER PUBLICATIONS

FR-2949414-A1 translation (Year: 2011).*
KR-20150141187-A translation (Year: 2015).*

* cited by examiner

DRIVER PERFORMS STEERING IN DIRECTION OF RECOVERING SPIN

DRIVER PERFORMS STEERING IN OPPOSITE DIRECTION
TO DIRECTION OF RECOVERING SPIN

VEHICLE CONTROL APPARATUS

CROSS-REFERENCE TO RELATED APPLICATIONS

The present application claims priority from Japanese Patent Application No. 2020-208128 filed on Dec. 16, 2020, the entire contents of which are hereby incorporated by reference.

BACKGROUND

The technology relates to a vehicle control apparatus that performs an attitude stabilization control of a vehicle.

For example, Japanese Unexamined Patent Application Publication (JP-A) No. 2014-237341 discloses a technique related to a control, etc., upon a collision of a vehicle such as an automobile. The technique disclosed in JP-A No. 2014-237341 provides a touch sensor adapted to detect a gripping state of a steering wheel of an occupant, and controls an expansion of an airbag by determining an attitude-keeping state of the occupant on the basis of the touch sensor after the collision.

JP-A No. 2009-208559 discloses a collision prevention assist device having an automatic braking function. JP-A No. 2009-208559 discloses that an attitude of an occupant before a collision is determined on the basis of a gripping state of a steering wheel, and that a timing of overriding the automatic braking is changed on the basis of gripping data.

JP-A No. 2017-30659 discloses that a holding state of a steering wheel of a driver is detected on the basis of a steering torque, and that a lane keep control or a lane-following assist control is performed on the basis of steering wheel holding data upon a normal situation. Upon a collision, JP-A No. 2017-30659 discloses that the lane keep control is performed irrespective of a presence of the holding of the steering wheel.

Japanese Unexamined Patent Application Publication (Translation of PCT Application) (JP-T) No. 2008-537920 discloses that an override of a stabilization control of a vehicle is performed after a collision. To address an erroneous action taken by a panicked driver, JP-T No. 2008-537920 discloses that a control algorithm is designed so as not to take into consideration an operation intended to perform the steering set by the driver who is panicked by the collision.

JP-A No. H10-258756 discloses a technique related to a determination on a driver's intention to perform the steering, for example. JP-A No. H10-258756 discloses a steering device in which an automatic steering mode and a normal steering mode are selectable. JP-A No. H10-258756 further discloses that a determination is made as to whether an added steering force is applied by a driver or is based on a disturbance, on the basis of whether a change in rotation angle on a steering wheel side of a steering shaft precedes a change in rotation angle on a wheel side of the steering shaft.

SUMMARY

An aspect of the technology provides a vehicle control apparatus to be applied to a vehicle. The vehicle control apparatus includes a contact detector, an attitude stabilization processor, and a steering intention determining unit. The contact detector is configured to detect a contact of the vehicle with an object. The attitude stabilization processor is configured to execute an attitude stabilization control for generating a yaw moment at a body of the vehicle on the basis of a deviation between a target yaw rate and an actual yaw rate, in which the target yaw rate is calculated on the basis of a steering angle of a steering device. The steering intention determining unit is configured to determine a presence of an intention, of a driver who drives the vehicle, to perform steering. The attitude stabilization processor is configured to stop the generating of the yaw moment by the attitude stabilization control or reduce the yaw moment to be generated by the attitude stabilization control, in a case where the steering intention determining unit determines that the driver's intention to perform the steering is absent after a detection of the contact by the contact detector.

An aspect of the technology provides a vehicle control apparatus to be applied to a vehicle. The vehicle control apparatus includes a contact detector, an attitude stabilization processor, and a gripping state detector. The contact detector is configured to detect a contact of the vehicle with an object. The attitude stabilization processor is configured to execute an attitude stabilization control for generating a yaw moment at a body of the vehicle on the basis of a deviation between a target yaw rate and an actual yaw rate, in which the target yaw rate is calculated on the basis of a steering angle of a steering device. The gripping state detector is configured to detect a state of gripping of a steering operation device by a driver who drives the vehicle. The attitude stabilization processor is configured to stop the generating of the yaw moment by the attitude stabilization control or reduce the yaw moment to be generated by the attitude stabilization control, in any case excluding a case where, after a detection of the contact by the contact detector: the gripping of the steering operation device by the driver is detected by the gripping state detector; and a steering direction of the steering device is in an opposite direction to a yaw rate generated at the body of the vehicle by the contact.

An aspect of the technology provides a vehicle control apparatus to be applied to a vehicle. The vehicle control apparatus includes a contact detector, an attitude stabilization processor, a gripping state detector, and a steering torque detector. The contact detector is configured to detect a contact of the vehicle with an object. The attitude stabilization processor is configured to execute an attitude stabilization control for generating a yaw moment at a body of the vehicle on the basis of a deviation between a target yaw rate and an actual yaw rate, in which the target yaw rate is calculated on the basis of a steering angle of a steering device. The gripping state detector is configured to detect a state of gripping of a steering operation device by a driver who drives the vehicle. The steering torque detector is configured to detect a steering torque to be applied the steering operation device. The attitude stabilization processor is configured to stop the generating of the yaw moment by the attitude stabilization control or reduce the yaw moment to be generated by the attitude stabilization control, in any case excluding a case where, after a detection of the contact by the contact detector: the gripping of the steering operation device by the driver is detected by the gripping state detector; and the steering torque detected by the steering torque detector is equal to or greater than a predetermined value.

An aspect of the technology provides a vehicle control apparatus to be applied to a vehicle. The vehicle control apparatus includes a contact detector and an attitude stabilization processor. The contact detector is configured to detect a contact of the vehicle with an object. The attitude stabilization processor is configured to execute an attitude stabilization control for generating a yaw moment at a body of the vehicle on the basis of a deviation between a target yaw rate and an actual yaw rate, in which the target yaw rate is calculated on the basis of a steering angle of a steering device. The attitude stabilization processor is configured to stop the generating of the yaw moment by the attitude stabilization control or reduce the yaw moment to be generated by the attitude stabilization control, in a case where a steering direction of the steering device and a direction of the actual yaw rate are in the same direction as each other after the detection of the contact by the contact detector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
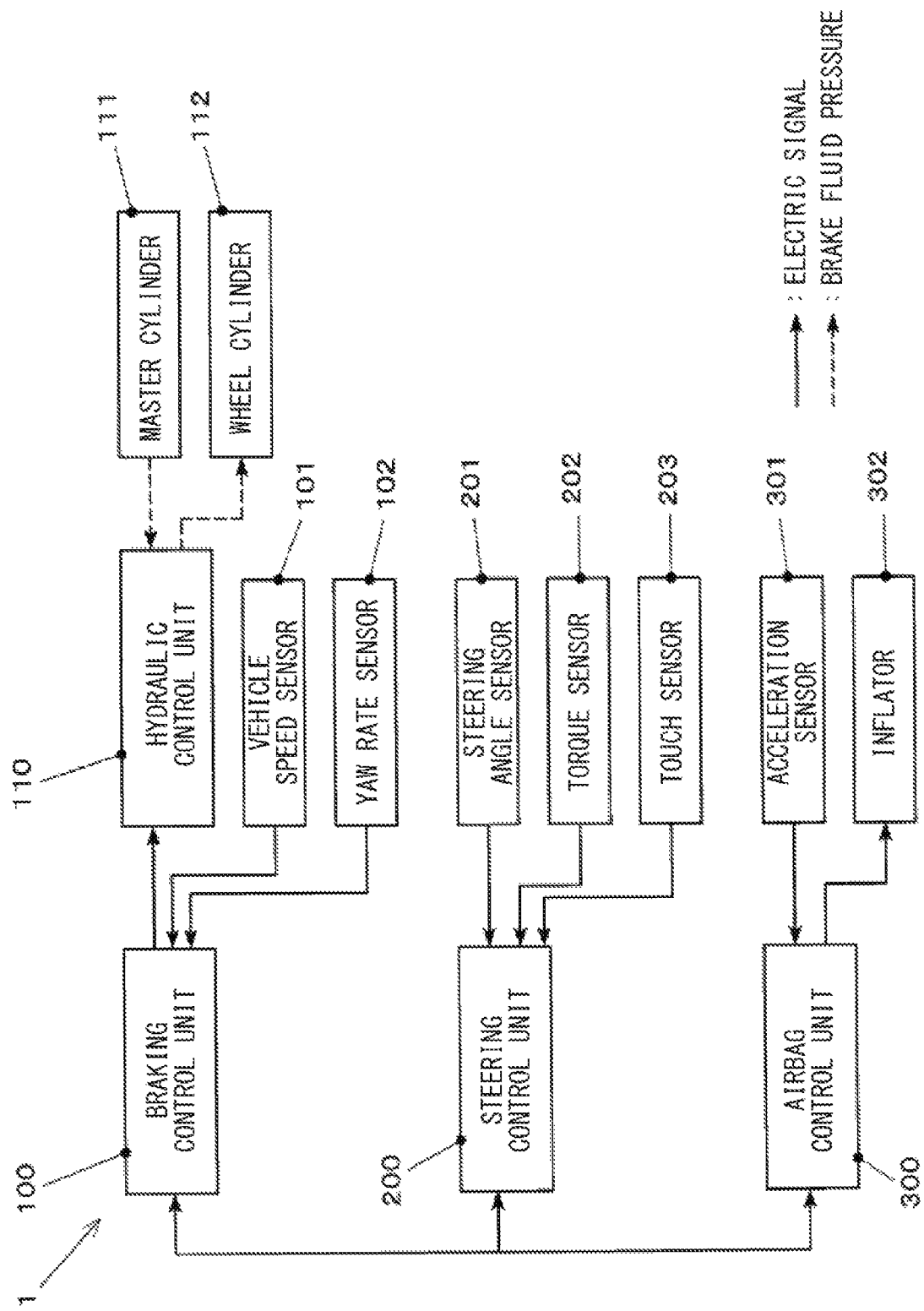
FIG. 1 is a block diagram schematically illustrating an example of a configuration of a vehicle control apparatus according to one example embodiment of the technology.

A vehicle such as an automobile may perform a vehicle body attitude control on the premise that an oversteer behavior or an understeer behavior is generated, in a case where an actual yaw rate deviates from a target yaw rate that is calculated on the basis of factors including, for example, a steering angle of a steering device and a vehicle speed. The vehicle body attitude control generates a difference in braking force between right and left wheels to thereby generate a yaw moment that suppresses the behavior.

However, the following example concern can arise in a case where a vehicle suffers from a collision damage and thus involves a spin state in which the severe oversteer behavior is generated or a plow state in which the severe understeer behavior is generated. That is, executing an override of the vehicle body attitude control in a case where a driver has unintentionally performed a steering operation in a direction of promoting the behavior due to an impact of the collision can, for example, promote a yaw rate in a spin direction, which in turn can worsen the situation even more.

It is desirable to provide a vehicle control apparatus that makes it possible to prevent a vehicle behavior, attributed to a steering operation unintended by a driver, from being promoted by an attitude stabilization control after a collision.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

A description is given below of a vehicle control apparatus according to a first example embodiment of the technology.

The vehicle control apparatus according to any of the following example embodiments of the technology, including the first example embodiment, may be configured to be mounted on a vehicle such as an automobile, including a passenger car.

The vehicle control apparatus according to the first example embodiment may perform a post-crash braking control, or a multi-collision brake control. The post-crash braking control may execute braking automatically and thereby decelerates or stops an own vehicle in a case where the own vehicle collides with an object such as another vehicle.

The vehicle control apparatus according to an example embodiment also performs a behavior stabilization control that generates a difference in braking force between right and left wheels to thereby keep a stable turning state in a steering direction upon an occurrence of an oversteer behavior or an understeer behavior.

FIG. 1 is a block diagram schematically illustrating an example of a configuration of a vehicle control apparatus 1 according to the first example embodiment.

The vehicle control apparatus 1 includes a braking control unit 100, a steering control unit 200, and an airbag control unit 300. The vehicle control apparatus 1 may also include any other device including, for example, a hydraulic control unit 110.

The braking control unit 100, the hydraulic control unit 110, the steering control unit 200, and the airbag control unit 300 each may be or include a microcomputer having devices including, for example, a data processor, a storage, an input/output interface, and a bus. The data processor may be a central processing unit (CPU). The storage may be any memory such as a random-access memory (RAM) or a read-only memory (ROM). The bus may couple the data processor, the storage, and the input/output interface together.

The braking control unit 100, the hydraulic control unit 110, the steering control unit 200, and the airbag control unit 300 each may transmit various pieces of data via an in-vehicle local area network (LAN) such as a controller area network (CAN) communication system, or each may communicate directly with each other to transmit the various pieces of data.

The braking control unit 100 may control an unillustrated fluid-pressure-based service brake that is provided for each wheel of the vehicle. In one embodiment, the service brake may serve as a "braking device".

The braking control unit 100 may give a command to the hydraulic control unit 110 to individually control a brake fluid pressure of a wheel cylinder 112 of each wheel and thereby to generate the desired braking force to the service brake of each wheel.

The braking control unit 100 may be coupled to devices including, for example, a vehicle speed sensor 101 and a yaw rate sensor 102.

The vehicle speed sensor 101 may detect a rotation speed, or a wheel speed, of a corresponding wheel.

The yaw rate sensor 102 may detect a yaw rate. The yaw rate may be a rotation speed around a vertical axis of a vehicle body of the vehicle.

An output of the vehicle speed sensor 101 and an output of the yaw rate sensor 102 may be used for controls including, for example, an anti-lock braking control and the attitude stabilization control to be described below.

The braking control unit 100 may perform the anti-lock braking control that recovers a rotation of a wheel by decreasing the brake fluid pressure of the corresponding wheel when a wheel lock is occurred upon braking, for example.

The braking control unit 100 may perform, upon an occurrence of an understeer behavior or an oversteer behavior of the vehicle, the attitude stabilization control that generates a difference in braking force between right and left wheels to generate a yaw moment in a direction of suppressing the behavior.

The braking control unit 100 may calculate a target yaw rate, on the basis of a steering angle of a steering device obtained from the steering control unit 200 and a vehicle speed detected by the vehicle speed sensor 101. The target yaw rate may be a yaw rate that can be generated at a vehicle body upon a normal traveling.

The braking control unit 100 may set an orientation and a magnitude of the yaw moment to be generated by a control of the braking force, on the basis of a deviation between an actual yaw rate detected by the yaw rate sensor 102 and the target yaw rate.

The braking control unit 100 may cause a yaw moment to be generated that is in the same direction as the yaw rate in a steering angle direction (i.e., a turning direction) of the steering device in a case where an absolute value of the actual yaw rate is less than an absolute value of the target yaw rate, on the premise that the understeer behavior is generated.

In a case where the absolute value of the actual yaw rate is greater than the absolute value of the target yaw rate, the braking control unit 100 may cause a yaw moment to be generated that is in the opposite direction to the yaw rate in a steering direction of the steering device, on the premise that the oversteer behavior is generated.

Thus, the vehicle may be so controlled as to keep a stable turning attitude that is based on a direction and a steering amount (i.e., a steering wheel angle) of the steering performed by a driver.

In one embodiment, the braking control unit 100 may serve as "an attitude stabilization processor".

The braking control unit 100 may also perform the post-crash braking control, or the multi-collision brake control, that generates the braking force automatically and thereby decelerates or stops the vehicle, upon an occurrence of a collision that involves not less than a predetermined impact (or acceleration) on the vehicle. In one embodiment, the braking control unit 100 may serve as a "braking processor".

The hydraulic control unit 110 may individually adjust the brake fluid pressure of the wheel cylinder 112 of each wheel.

The hydraulic control unit 110 may include an electric pump that increases a pressure of a brake fluid. The hydraulic control unit 110 may also include valves that control the brake fluid pressure of each wheel cylinder 112, including, for example, a pressure-increasing valve, a pressure-decreasing valve, and a pressure holding valve.

The hydraulic control unit 110 may be coupled, via a brake fluid piping, to devices including, for example, a master cylinder 111 and a wheel cylinder 112.

The master cylinder 111 may increase the pressure of the brake fluid in response to an operation of an unillustrated brake pedal performed by the driver.

The brake fluid pressure generated by the master cylinder 111 may be configured to be transmitted to the wheel cylinder 112 through the hydraulic control unit 110.

The hydraulic control unit 110 may perform an override of the brake fluid pressure generated by the master cylinder 111 to increase or decrease the brake fluid pressure of each wheel cylinder 112.

The wheel cylinder 112 may be provided for each wheel, and may generate friction force, or the braking force, that corresponds to the brake fluid pressure. For example, the wheel cylinder 112 may have a disc rotor and a brake pad to be pressed against the disc rotor.

The steering control unit 200 may control the steering device that steers front wheels serving as steered wheels of the vehicle.

Figure 2:
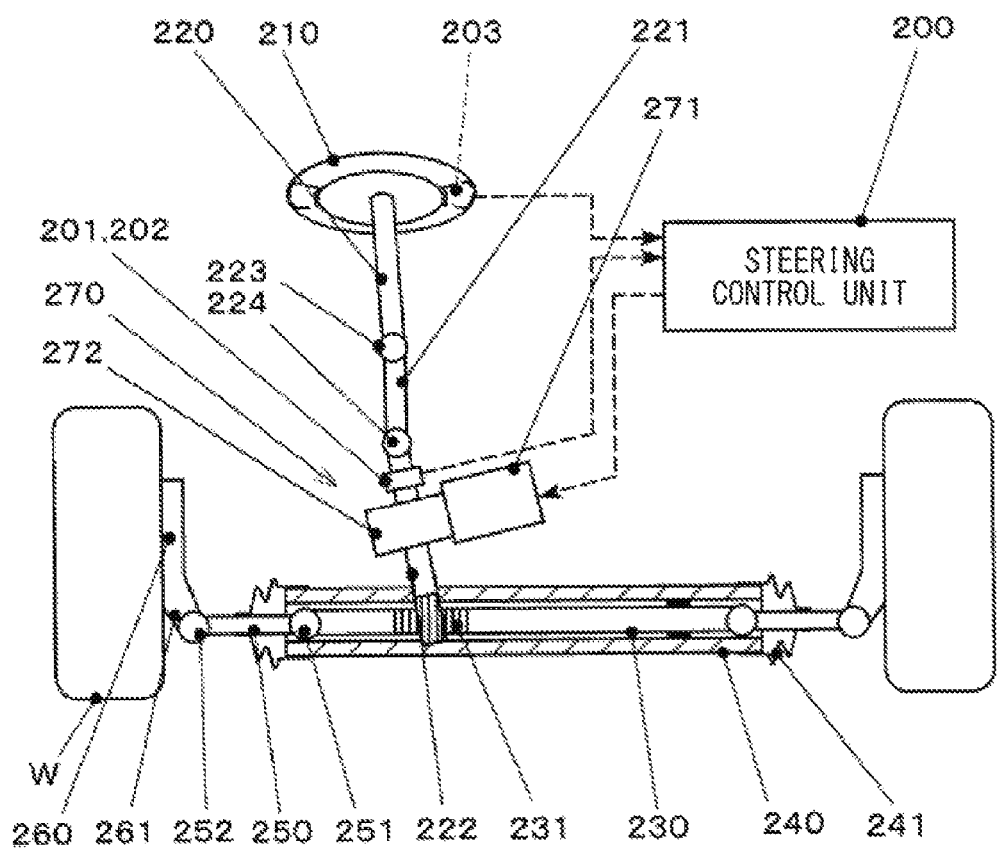
FIG. 2 is a diagram schematically illustrating a configuration of a steering device of a vehicle of one example embodiment.

FIG. 2 is a diagram schematically illustrating a configuration of the steering device of the vehicle of the first example embodiment.

The steering device may include an electronic power steering (EPS) device as a power-assisted mechanism. For example, the EPS device may be of a pinion-assisted type.

The steering device may include devices including, for example, a steering wheel 210, a steering shaft 220, an intermediate shaft 221, a pinion shaft 222, a rack shaft 230, a rack housing 240, a tie rod 250, a housing 260, and an actuator unit 270.

The steering wheel 210 may be an annular operating member that receives an input of a steering operation based on pivoting performed by the driver. In one embodiment, the steering wheel 210 may serve as a "steering operation device".

The steering wheel 210 may be so disposed as to face a driver's seat in a vehicle compartment of the vehicle.

The steering shaft 220 may be a rotary shaft having one end that is attached to the steering wheel 210. The steering shaft 220 may transmit a rotating operation of the steering wheel 210 to a rack-and-pinion mechanism. The rack-and-pinion mechanism may convert the rotating operation of the steering shaft 220 into a translational motion in a vehicle width direction of the vehicle.

The steering shaft 220 may have an end that is positioned on an opposite side of the steering wheel 210 and that is sequentially coupled to the intermediate shaft 221 and the pinion shaft 222.

Between the steering shaft 220 and the intermediate shaft 221 may be a universal joint (or a Cardan joint) 223 adapted to transmit a rotation with respective shafts being bent. Between the intermediate shaft 221 and the pinion shaft 222 may be a universal joint (or a Cardan joint) 224 adapted to transmit a rotation with respective shafts being bent.

The pinion shaft 222 may have a tip having a pinion gear. The pinion gear may be engaged with a rack gear 231 of the rack shaft 230 and drive the rack shaft 230.

The rack shaft 230 may be a columnar member so disposed that a longitudinal direction, or an axial direction, thereof is oriented in the vehicle width direction.

The rack shaft 230 may be so supported as to perform a translation movement in the vehicle width direction with respect to the vehicle body of the vehicle.

The rack shaft 230 may include a region having the rack gear 231. The rack gear 231 may be engaged with the pinion gear of the pinion shaft 222.

The rack shaft 230 may perform the translation movement, or move straight, in the vehicle width direction as a result of the driving of the rack gear 231 by the pinion gear in response to the rotation of the steering shaft 220.

The rack housing 240 is a substantially cylindrical member. The rack housing 240 may contain the rack shaft 230 while supporting the rack shaft 230 in a relatively displaceable fashion in the vehicle width direction.

The rack housing 240 may have both ends each having a rack boot 241.

The rack boot 241 may prevent entry of a foreign matter such as a dust into the rack housing 240 while allowing the relative displacement of the tie rod 250 relative to the rack housing 240.

The rack boot 241 may include a resin-based material such as an elastomer, and may be formed in a shape of a bellows tube having flexibility.

The tie rod 250 may be an axial interlocking member that couples an end of the rack shaft 230 and a knuckle arm 261 of the housing 260 together, and causes the housing 260 to pivot about a kingpin axis in conjunction with the translational motion of the rack shaft 230.

The tie rod 250 may have an inner end in the vehicle width direction. The inner end of the tie rod 250 may be pivotally coupled via a ball joint 251 to an end of the tie rod 230.

The tie rod 250 may have an outer end in the vehicle width direction. The outer end of the tie rod 250 may be coupled via a ball joint 252 to the knuckle arm 261 of the housing 260.

A part at which the tie rod 250 and the ball joint 252 are coupled may be provided with a turnbuckle mechanism for toe-in adjustment.

The housing (i.e., a knuckle or an upright) 260 may contain a hub bearing. The hub bearing may rotatably support a wheel W about an axle.

The housing 260 may have the knuckle arm 261. The knuckle arm 261 may protrude forward or rearward with respect to the axle.

The housing 260 may be rotatably supported about the kingpin axis. The kingpin axis may be a predetermined rotation center axis.

The kingpin axis may be a virtual axis that connects the bearing center of a strut top mount and the center of a ball joint in an example case where a front suspension of the vehicle is of a MacPherson strut type. The ball joint may couple a lower part of the housing 260 and a transverse link (i.e., a lower arm).

The housing 260 may be pushed and pulled in the vehicle width direction by the rack shaft 230 via the tie rod 250. Thus, the housing 260 may pivot about the king pin axis and steer the wheel W.

The actuator unit 270 may be a drive device that drives and rotates the pinion shaft 222 to perform a power assist upon manual driving or perform a steering operation upon automatic driving.

The actuator unit 270 may have devices including, for example, a motor 271 and a gear box 272.

The motor 271 may be an electric actuator that generates a driving force to be applied to the steering shaft 220.

The motor 271 may be controlled by the steering control unit 200. The steering control unit 200 may control a rotation direction and an output torque of the motor 271.

The gearbox 272 may include a reduction gear train that decelerates, or performs a torque amplification, of a rotational output of the motor 271 and transmits the decelerated rotational output to the pinion shaft 222.

The steering control unit 200 may be coupled to devices including, for example, a steering angle sensor 201, a torque sensor 202, and a touch sensor 203.

The steering angle sensor 201 and the torque sensor 202 may be integrated, for example. The steering angle sensor 201 and the torque sensor 202 may be provided in a region, of the pinion shaft 222, which is closer to the steering wheel 210 than the actuator unit 270.

The steering angle sensor 201 may have an angle encoder that detects a rotational angle position of the pinion shaft 222. The rotational angle position may be substantially equal to a rotational angle position of the steering wheel 210.

The torque sensor 202 may detect a torque that acts on the pinion shaft 222. For example, the torque sensor 202 may detect an input torque derived from the steering wheel 210.

The touch sensor 203 may be provided on a rim of the steering wheel 210, and may detect a gripping force applied on the steering wheel 210 by the driver. The rim may be a part of the steering wheel 210 to be gripped by the driver.

The airbag control unit 300 may control expansion and inflation of an airbag. The airbag may be provided in the vehicle compartment of the vehicle, and may restrain an occupant upon the collision.

For example, the airbag may have a base fabric that includes nylon fibers, and may be configured to be formed into a bag shape. The airbag may expand and inflate as a result of introduction of an expansion gas upon the collision to restrain, for example, the occupant.

The airbag control unit 300 may be coupled to devices including, for example, an acceleration sensor 301 and an inflator 302.

The acceleration sensor 301 may be provided at each of multiple locations of the vehicle body. The acceleration sensor 301 detects a collision of the vehicle 1. For example, the acceleration sensor 301 may detect acceleration that acts on the vehicle body upon the collision. In one embodiment, the acceleration sensor 301 may serve as a "collision detector" or a "contact detector".

The inflator 302 may be a gas generator that supplies the expansion gas to each airbag provided in the vehicle 1, in response to a command given from the airbag control unit 300.

A description is given hereinafter of an operation, upon the collision, of the vehicle control apparatus according to the first example embodiment.

Figure 3:
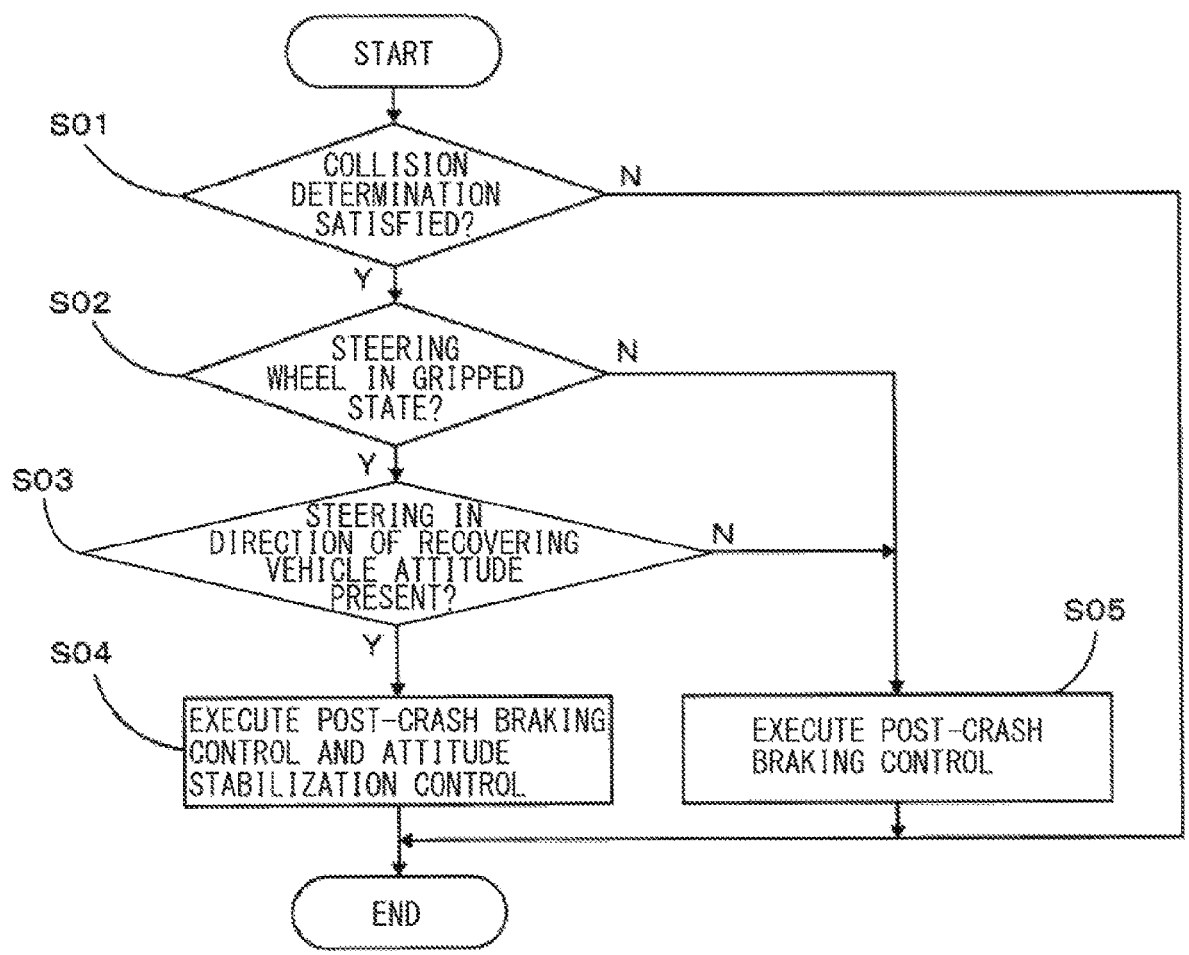
FIG. 3 is a flowchart illustrating an example of an operation, upon a collision, of the vehicle control apparatus according to one example embodiment.

FIG. 3 is a flowchart illustrating an example of the operation, upon the collision, of the vehicle control apparatus according to the first example embodiment.

Hereinafter, each step will be described in order.

[Step S01: Determination of Occurrence of Collision]

The airbag control unit 300 may determine whether a collision that involves acceleration that is equal to or greater than a predetermined threshold is generated, on the basis of an output of the acceleration sensor 301.

The threshold may be set in consideration of the acceleration to be generated upon the collision at a level that requires the expansion and the inflation of the airbag.

If the airbag control unit 300 determines that the collision that involves the acceleration equal to or greater than the threshold is generated (step S01: Y), the operation may proceed to step S02. Otherwise, a series of processes may end or may be returned (step S01: N).

[Step S02: Determination of Gripping State of Steering Wheel]

The steering control unit 200 may detect the gripping force applied on the steering wheel 210 by the driver, on the basis of an output of the touch sensor 203. In one embodiment, the steering control unit 200 may serve as a "gripping state detector".

If the steering control unit 200 determines that the gripping force is equal to or greater than a predetermined threshold (step S02: Y), the operation may proceed to step S03 on the premise that a normal gripping state is maintained that involves a driver's intention to perform the steering. Otherwise, the operation may proceed to step S05 (step S02: N).

[Step S03: Determination of Steering in Direction of Recovering Vehicle Attitude]

The steering control unit 200 may obtain, from the braking control unit 100, data on the actual yaw rate that is generated at the vehicle body after the collision and detected by the yaw rate sensor 102.

In addition, the steering control unit 200 may detect a current steering direction, on the basis of an output of the steering angle sensor 201.

The steering control unit 200 may compare the current steering direction with a direction of generation of the actual yaw rate generated after the collision. If the current steering direction and the generation direction of the actual yaw rate generated after the collision are in the opposite directions, the steering control unit 200 may cause the operation to proceed to step S04 by determining that the driver intends to recover a vehicle attitude by the steering operation from a vehicle behavior generated as a result of the collision (step S03: Y). Otherwise, the operation may proceed to step S05 (step S03: N). Non-limiting examples of the vehicle behavior generated as a result of the collision may include a spin state that involves the abrupt and significant oversteer behavior and a plow state that involves the abrupt and significant understeer behavior.

In one embodiment, the steering control unit 200 may serve as a "steering intention determining unit". The steering intention determining unit determines a presence of the driver's intention to perform the steering.

[Step S04: Execution of Post-Crash Braking Control and Attitude Stabilization Control]

The braking control unit 100 may execute the post-crash braking control that causes the fluid-pressure-based service brake to generate the braking force and thereby decelerates the vehicle at predetermined deceleration and eventually stops the vehicle.

Further, the braking control unit 100 executes the attitude stabilization control that generates a yaw moment on the basis of the deviation between the target yaw rate and the actual yaw rate. The attitude stabilization control may generate, by means of a difference in braking force between the right and the left wheels, the yaw moment that brings the actual yaw rate closer to the target yaw rate. The target yaw rate may be calculated on the basis of, for example, the steering angle that is based on an operation of the steering wheel performed by the driver.

Thereafter, a series of processes may end or may be returned.

[Step S05: Execution of Post-Crash Braking Control]

The braking control unit 100 may execute the post-crash braking control.

In addition, the braking control unit 100 may prohibit the execution of the attitude stabilization control.

Thereafter, a series of processes may end or may be returned.

In the following, a description is given of some example effects according to the first example embodiment.

Figure 4A:
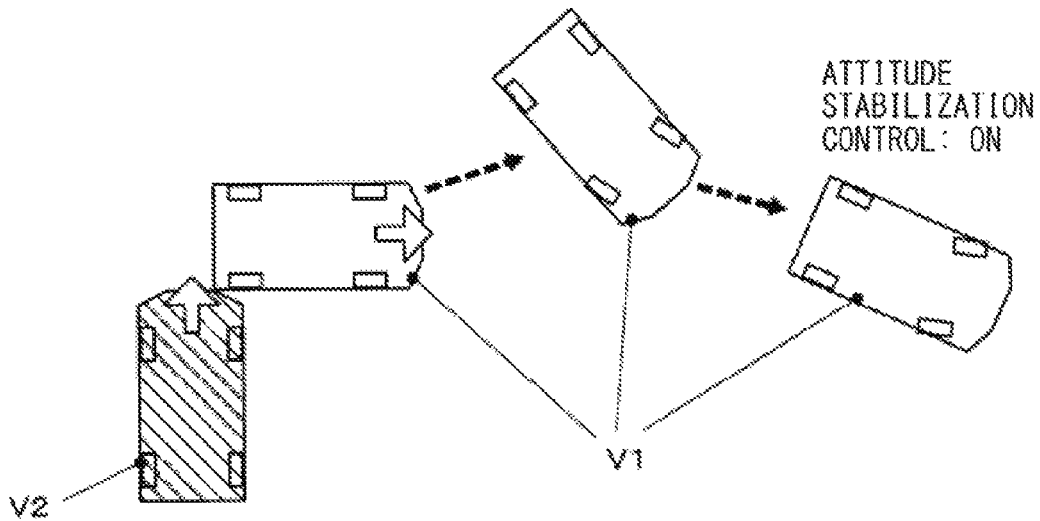
FIGS. 4A and 4B each illustrate an example of a transition of a behavior in a case where the vehicle has received a broadside collision.
Figure 4B:
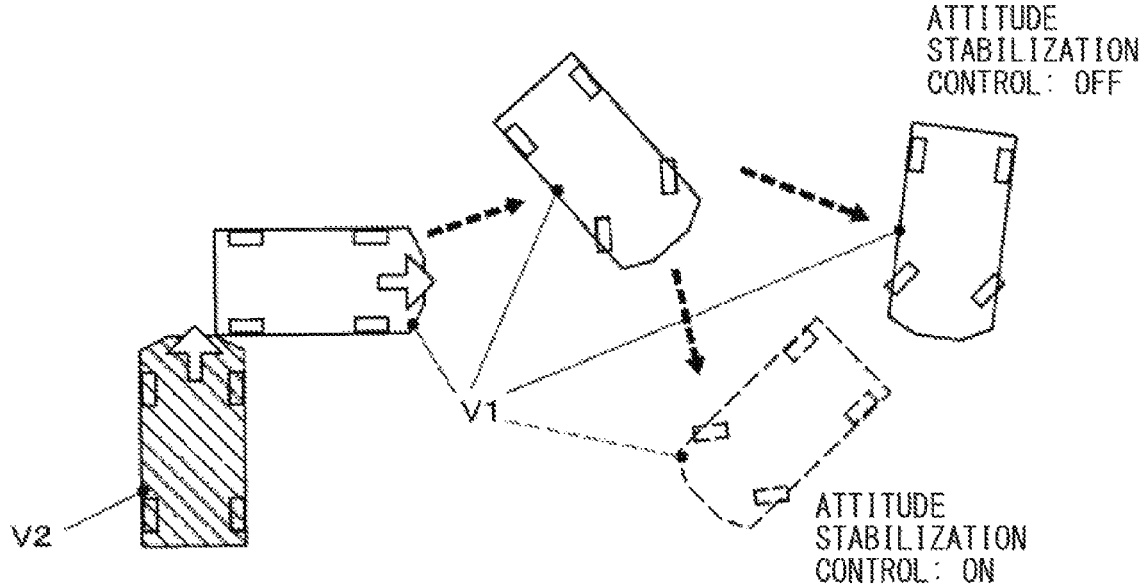

FIGS. 4A and 4B each illustrate an example of a transition of a behavior in a case where the vehicle has received a broadside collision.

FIGS. 4A and 4B each illustrate, in chronological order, an example of a vehicle behavior where an own vehicle V1 has received the broadside collision by another vehicle V2 from the left side at the rear of the own vehicle V1 during the traveling of the own vehicle V1, and where the own vehicle V1 involves the spin state in a clockwise direction.

FIG. 4A illustrates a situation where the driver has performed the steering operation in a left direction (performed a counter steer) in an attempt to recover from the spin state after the collision.

In this situation, a direction of the steering performed by the driver is in the opposite direction to the yaw rate generated at the body of the vehicle by the collision.

Accordingly, it is possible to promote the recovery to a normal vehicle attitude by executing the attitude stabilization control, in a case where the driver has performed an operating of recovering from the spin state at his/her discretion.

FIG. 4B illustrates a situation where the driver has unintentionally performed, due to, for example, an impact of the collision, the steering in a right direction that is in the same direction as the spin state after the collision.

In this situation, if the attitude stabilization control is executed, a yaw rate in a direction of the spin increases as a result of the attitude stabilization control, consequently promoting the spin state even more.

In this case, the vehicle can involve a state in which the vehicle is uncontrolled by the driver, which in turn can travel on an incoming lane side with the spin state being kept or can collide with an obstacle such as a guardrail.

Accordingly, the first example embodiment may prohibit the execution of the attitude stabilization control and may perform only the post-crash braking control, in a case where the driver does not grip the steering wheel 210 normally or where the steering operation in the direction of recovering from the spin is not performed. Thus, it is possible to decelerate or stop the vehicle without worsening the spin state and to reduce a possibility of a damage resulting from a secondary collision.

According to the first example embodiment described above, the generation of the yaw moment by the attitude stabilization control is stopped on the premise that the driver's intention to perform the steering is absent, in any case excluding a case where: the steering wheel 210 is gripped; and the steering direction of the steering device is in the direction of recovering from the behavior resulting from the collision. Hence, it is possible to prevent the attitude of the vehicle from being worsened due to the override of the attitude stabilization control executed in response to the steering operation unintended by the driver.

In addition, the override of the attitude stabilization control may be performed in a case where: the steering wheel 210 is gripped; and the steering direction of the steering device is in the direction of recovering from the behavior resulting from the collision. Hence, it is possible to promote the recovery to a normal state while preventing a side slip or an overturn of the vehicle by executing the override of the attitude stability control.

Further, the vehicle may be decelerated or stopped in response to the collision, thereby helping to ensure even more that an occurrence of a damage caused by the secondary collision is prevented.

Second Example Embodiment

A description is given next of a vehicle control apparatus according to a second example embodiment of the technology.

In the following, differences between the first example embodiment and each example embodiment to be described below are mainly described, while the similarities between the first example embodiment and each example embodiment to be described below are denoted with the same reference to avoid repetitive description.

The second and the third example embodiments differ from the first example embodiment, in that a logic that determines the presence of the driver's intention to perform the steering after the collision is different.

Figure 5:
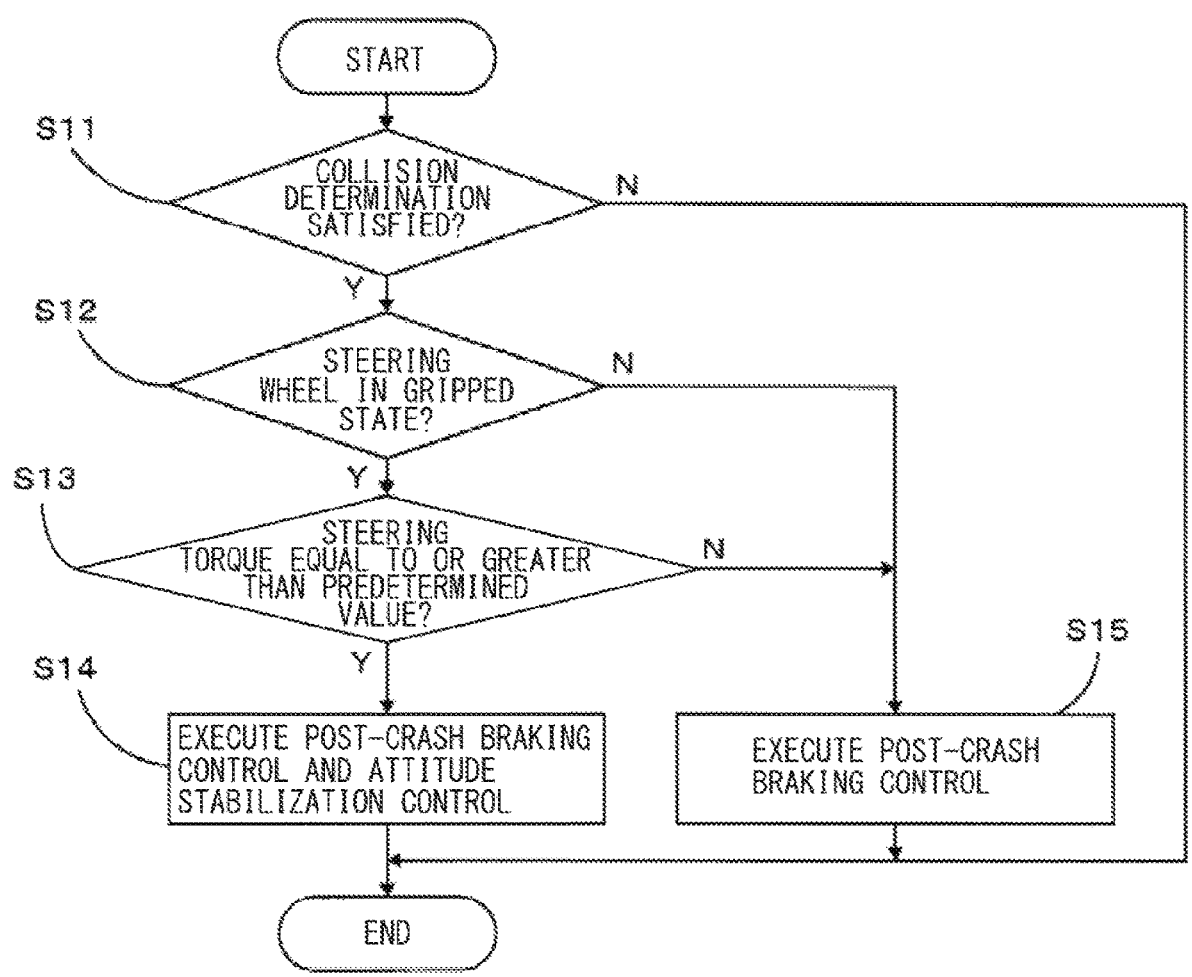
FIG. 5 is a flowchart illustrating an example of an operation, upon a collision, of the vehicle control apparatus according to one example embodiment of the technology.

FIG. 5 is a flowchart illustrating an example of the operation, upon the collision, of the vehicle control apparatus according to the second example embodiment.

Hereinafter, each step will be described in order.
[Step S11: Determination of Occurrence of Collision]

If the airbag control unit 300 determines that the collision that involves the acceleration equal to or greater than the threshold is generated (step S11: Y), the operation may proceed to step S12. Otherwise, a series of processes may end or may be returned (step S11: N).
[Step S12: Determination of Gripping State of Steering Wheel]

If the steering control unit 200 determines that the gripping force detected by the touch sensor 203 is equal to or greater than a predetermined threshold (step S12: Y), the operation may proceed to step S13 on the premise that a normal gripping state is maintained that involves the driver's intention to perform the steering. Otherwise, the operation may proceed to step S15 (step S12: N).
[Step S13: Determination of Steering Torque]

The steering control unit 200 may determine whether a steering torque based on the steering operation performed by the driver is equal to or greater than a predetermined threshold, on the basis of an output of the torque sensor 202.

If the steering control unit 200 determines that the steering torque is equal to or greater than the predetermined value (step S13: Y), the operation may proceed to step S14 on the premise that a state of a normal steering operation is maintained that involves the driver's intention to perform the steering. Otherwise, the operation may proceed to step S15 (step S13: N).
[Step S14: Execution of Post-Crash Braking Control and Attitude Stabilization Control]

The braking control unit 100 may execute the post-crash braking control and the attitude stabilization control.

Thereafter, a series of processes may end or may be returned.
[Step S15: Execution of Post-Crash Braking Control]

The braking control unit 100 may execute the post-crash braking control, and may prohibit the execution of the attitude stabilization control.

Thereafter, a series of processes may end or may be returned.

According to the second example embodiment described above, the generation of the yaw moment by the attitude stabilization control is stopped or the yaw moment to be generated by the attitude stabilization control is reduced as compared with that in a normal situation on the premise that the driver's intention to perform the steering is absent, in any case excluding a case where: the steering wheel 210 is gripped; and the steering torque is equal to or greater than the predetermined threshold. Hence, it is possible to prevent the attitude of the vehicle from being worsened due to the override of the attitude stabilization control executed in response to the steering operation unintended by the driver.

In addition, the override of the attitude stabilization control may be performed in a case where: the steering wheel 210 is gripped; and the steering torque is equal to or greater than the predetermined threshold. Hence, it is possible to promote the recovery to a normal state while preventing a side slip or an overturn of the vehicle by executing the override of the attitude stability control.

Third Example Embodiment

A description is given next of a vehicle control apparatus according to a third example embodiment of the technology.

Figure 6:
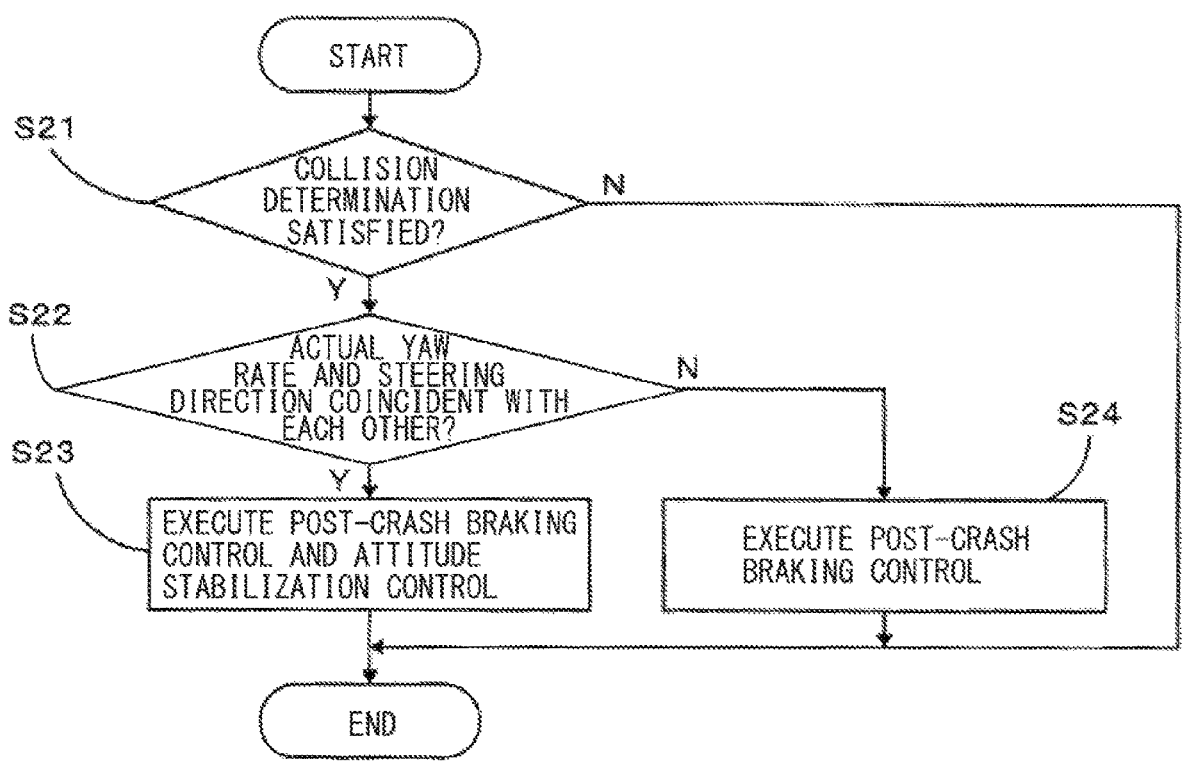
FIG. 6 is a flowchart illustrating an example of an operation, upon a collision, of the vehicle control apparatus according to one example embodiment of the technology.

FIG. 6 is a flowchart illustrating an example of the operation, upon the collision, of the vehicle control apparatus according to the third example embodiment.

Hereinafter, each step will be described in order.
[Step S21: Determination of Occurrence of Collision]

If the airbag control unit 300 determines that the collision that involves the acceleration equal to or greater than the threshold is generated (step S21: Y), the operation may proceed to step S22. Otherwise, a series of processes may end or may be returned (step S21: N).
[Step S22: Determination of Steering Direction]

The steering control unit 200 may obtain, from the braking control unit 100, the data on the current actual yaw rate.

In addition, the steering control unit 200 may detect the current steering direction, on the basis of the output of the steering angle sensor 201.

If the steering control unit 200 determines that the steering direction of the steering device is in the opposite direction to the direction of the actual yaw rate (step S22: Y), the operation may proceed to step S23 on the premise that the driver attempts to restore, at his/her discretion, the vehicle attitude disturbed by the collision. If the steering control unit 200 determines that the steering direction of the steering device is in the same direction as the direction of the actual yaw rate (step S22: N), the operation may proceed to step S24 on the premise that the steering operation unintended by the driver is performed due to, for example, an impact of the collision.
[Step S23: Execution of Post-Crash Braking Control and Attitude Stabilization Control]

The braking control unit 100 may execute the post-crash braking control and the attitude stabilization control.

Thereafter, a series of processes may end or may be returned.
[Step S24: Execution of Post-Crash Braking Control]

The braking control unit 100 may execute the post-crash braking control, and may prohibit the execution of the attitude stabilization control.

Thereafter, a series of processes may end or may be returned.

According to the third example embodiment described above, the generation of the yaw moment by the attitude stabilization control is stopped on the premise that the driver's intention to perform the steering is absent, in a case where the steering direction of the steering device and the direction of the actual yaw rate are in the same direction as each other. Hence, it is possible to prevent the attitude of the vehicle from being worsened due to the override of the attitude stabilization control executed in response to the steering operation unintended by the driver.

In addition, the override of the attitude stabilization control may be performed in a case where the steering direction of the steering device and the direction of the actual yaw rate are in the opposite directions to each other. Hence, it is possible to promote the recovery to a normal state while preventing a side slip or an overturn of the vehicle by executing the override of the attitude stability control. [Modification Examples]

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) For instance, a configuration of the vehicle control apparatus and/or a configuration of the vehicle may be variously modified as necessary without being limited to the configurations described in the above example embodiments.

For example, the attitude stabilization control of the vehicle of each of the example embodiments described above may utilize the difference in braking force between the right and the left wheels. Alternatively or in addition to, an attitude stabilization control that utilizes any other method may be used. In some embodiments, the attitude stabilization control may utilize a difference in driving force between the right and the left wheels. In some embodiments, the attitude stabilization control may utilize an additional steering angle to be added to the steering device.

(2) For instance, the execution of the attitude stabilization control may be prohibited in each of the example embodiments described above, in a case where, for example, the driver's intention to perform the steering is determined as being absent; however, this is non-limiting. In some embodiments, a gain of the attitude stabilization control may be decreased as compared with that of a case where the driver's intention to perform the steering is determined as being present, or as compared with that of a normal situation. In some embodiments, the yaw moment to be generated by the attitude stabilization control may be reduced as compared with that of a case where the driver's intention to perform the steering is determined as being present, or as compared with that of a normal situation.

(3) For instance, a method of determining the presence of the driver's intention to perform the steering is not limited to the method described in each of the example embodiments described above and may be variously modified.

According to at least one embodiment of the technology, the generation of the yaw moment by the attitude stabilization control, which is a control that achieves a vehicle behavior faithful to the steering operation, is stopped or the yaw moment to be generated by the attitude stabilization control is reduced as compared with that in a normal situation, in a case where the driver's intention to perform the steering is determined as being absent. Thus, it is possible to prevent the attitude of the vehicle from being worsened due to the override of the attitude stabilization control executed in response to the driver's unintentional steering operation resulting from, for example, an impact of the collision. For example, it is possible to reduce a possibility of generation of a lane departure or a secondary collision involving the spin state.

Further, the override of the attitude stabilization control may be executed in a case where the driver's intention to perform the steering is determined as being present. Hence, it is possible to promote the recovery to a normal state while preventing a side slip or an overturn of the vehicle.

According to at least one embodiment of the technology, the generation of the yaw moment by the attitude stabilization control is stopped or the yaw moment to be generated by the attitude stabilization control is reduced as compared with that in a normal situation on the premise that the driver's intention to perform the steering is absent, in any case excluding a case where: the steering operation device is gripped; and the steering direction of the steering device is in the direction of recovering from the behavior resulting from the collision. Hence, it is possible to prevent the attitude of the vehicle from being worsened due to the override of the attitude stabilization control executed in response to the steering operation unintended by the driver.

In addition, the override of the attitude stabilization control may be performed in a case where: the steering operation device is gripped; and the steering direction of the steering device is in the direction of recovering from the behavior resulting from the collision. Hence, it is possible to promote the recovery to a normal state while preventing a side slip or an overturn of the vehicle.

According to at least one embodiment of the technology, the generation of the yaw moment by the attitude stabilization control is stopped or the yaw moment to be generated by the attitude stabilization control is reduced as compared with that in a normal situation on the premise that the driver's intention to perform the steering is absent, in any case excluding a case where: the gripping of the steering operation device by the driver is detected; and the steering torque is equal to or greater than a predetermined value. Hence, it is possible to prevent the attitude of the vehicle from being worsened due to the override of the attitude stabilization control executed in response to the steering operation unintended by the driver.

In addition, the override of the attitude stabilization control may be performed in a case where: the gripping of the steering operation device by the driver is detected; and the steering torque is equal to or greater than the predetermined value. Hence, it is possible to promote the recovery to a normal state while preventing a side slip or an overturn of the vehicle.

According to at least one embodiment of the technology, the generation of the yaw moment by the attitude stabilization control is stopped or the yaw moment to be generated by the attitude stabilization control is reduced as compared with that in a normal situation on the premise that the driver's intention to perform the steering is absent, or on the premise that the driver does not intend to recover from the behavior generated after the collision, in a case where the steering direction of the steering device and the direction of the actual yaw rate are in the same direction as each other. Hence, it is possible to prevent the attitude of the vehicle from being worsened due to the override of the attitude stabilization control executed in response to the steering operation unintended by the driver.

In addition, the override of the attitude stabilization control may be performed in a case where the steering direction of the steering device and the direction of the actual yaw rate are in the opposite directions to each other. Hence, it is possible to promote the recovery to a normal state while preventing a side slip or an overturn of the vehicle.

In some embodiments, the vehicle may be decelerated or stopped automatically in response to the collision, thereby helping to ensure even more that an occurrence of a damage caused by the secondary collision is prevented.

According to at least one embodiment of the technology, it is therefore possible to provide a vehicle control apparatus that makes it possible to prevent a vehicle behavior, attributed to a steering operation unintended by a driver, from being promoted by the attitude stabilization control after a collision.

As used herein, the term "collision" may be used interchangeably with the term "contact".

The braking control unit 100 and the steering control unit 200 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the braking control unit 100 and the steering control unit 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the braking control unit 100 and the steering control unit 200 illustrated in FIG. 1.

The invention claimed is:

1. A vehicle control apparatus to be applied to a vehicle, the vehicle control apparatus comprising:
   a contact detector including a sensor, the contact detector being configured to detect a contact of the vehicle with an object;
   one or more processors; and
   one or more memories storing instructions that, when executed by the one or more processors, cause the one or more processors to:
   determine a presence of an intention, of a driver who drives the vehicle, to perform steering;
   in response to determining that, after the contact detector detects the contact, i) there is a deviation between a target yaw rate and an actual yaw rate, the target yaw rate being calculated based on a steering angle of a steering device, and ii) the driver has the intention to perform the steering, execute an attitude stabilization control for generating a yaw moment at a body of the vehicle based on the deviation between the target yaw rate and the actual yaw rate; and
   in response to not determining that, after the contact detector detects the contact, the driver's intention to perform the steering is absent, stop the generating of the yaw moment by the attitude stabilization control or reduce the yaw moment to be generated by the attitude stabilization control after the contact detector detects the contact.

2. The vehicle control apparatus according to claim 1, further comprising a braking processor configured to execute a braking control that automatically decelerates the vehicle after the detection of the contact by the contact detector.

3. A vehicle control apparatus to be applied to a vehicle, the vehicle control apparatus comprising:
   a contact detector including a first sensor, the contact detector being configured to detect a contact of the vehicle with an object;
   a gripping state detector including a second sensor, the gripping state detector being configured to detect a state of gripping of a steering operation device by a driver who drives the vehicle;
   one or more processors; and
   one or more memories storing instructions that, when executed by the one or more processors, cause the one or more processors to:
   in response to determining that, after the contact detector detects the contact, i) there is a deviation between a target yaw rate and an actual yaw rate, the target yaw rate being calculated based on a steering angle of a steering device, ii) the gripping of the steering operation device by the driver is detected by the gripping state detector, and iii) a steering direction of the steering device is in an opposite direction to a yaw rate generated at a body of the vehicle by the contact, execute an attitude stabilization control for generating a yaw moment at the body of the vehicle based on a basis of a the deviation between the target yaw rate and the actual yaw rate; and
   in response to not determining that, after the contact detector detects the contact, i) the gripping of the steering operation device by the driver is detected by the gripping state detector, and ii) a steering direction of the steering device is in an opposite direction to a yaw rate generated at the body of the vehicle by the contact, stop the generating of the yaw moment by the attitude stabilization control or reduce the yaw moment to be generated by the attitude stabilization control after the contact detector detects the contact.

4. The vehicle control apparatus according to claim 3, further comprising a braking processor configured to execute a braking control that automatically decelerates the vehicle after the detection of the contact by the contact detector.

5. A vehicle control apparatus to be applied to a vehicle, the vehicle control apparatus comprising:
   a contact detector including a first sensor, the contact detector being configured to detect a contact of the vehicle with an object;
   a gripping state detector including a second sensor, the gripping state detector configured to detect a state of gripping of a steering operation device by a driver who drives the vehicle;
   a steering torque detector including a third sensor, the steering torque detector configured to detect a steering torque to be applied to the steering operation device;
   one or more processors; and
   one or more memories storing instructions that, when executed by the one or more processors, cause the one or more processors to:

in response to determining that after the contact detector detects the contact, i) there is a deviation between a target yaw rate and an actual yaw rate, the target yaw rate being calculated based on a steering angle of a steering device, ii) the gripping of the steering operation device by the driver is detected by the gripping state detector, and iii) the steering torque detected by the steering torque detector is equal to or greater than a predetermined value, execute an attitude stabilization control for generating a yaw moment at a body of the vehicle based on the deviation between the target yaw rate and the actual yaw rate; and in response to not determining that, after the contact detector detects the contact, i) the gripping of the steering operation device by the driver is detected by the gripping state detector, and ii) the steering torque detected by the steering torque detector is equal to or greater than the predetermined value, stop the generating of the yaw moment by the attitude stabilization control or reduce the yaw moment to be generated by the attitude stabilization control after the contact detector detects the contact.

6. The vehicle control apparatus according to claim 5, further comprising a braking processor configured to execute a braking control that automatically decelerates the vehicle after the detection of the contact by the contact detector.

7. A vehicle control apparatus to be applied to a vehicle, the vehicle control apparatus comprising:

a contact detector including a sensor, the contact detector being configured to detect a contact of the vehicle with an object;

one or more processors; and one or more memories storing instructions that, when executed by the one or more processors, cause the one or more processors to:

in response to determining that, after the contact detector detets the contact, i) there is a deviation between a target yaw rate and an actual yaw rate, the target yaw rate being calculated based on a steering angle of a steering device, and ii) a steering direction of the steering device and a direction of the actual yaw rate are in a same direction as each other, execute an attitude stabilization control for generating a yaw moment at a body of the vehicle based on the deviation between the target yaw rate and the actual yaw rate; and in response to not determining that, after the contact detector detects the contact, the steering direction of the steering device and the direction of the actual yaw rate are in the same direction as each other, stop the generating of the yaw moment by the attitude stabilization control or reduce the yaw moment to be generated by the attitude stabilization control after the contact detector detects the contact.

8. The vehicle control apparatus according to claim 7, further comprising a braking processor configured to execute a braking control that automatically decelerates the vehicle after the detection of the contact by the contact detector.

* * * * *